United States Patent [19]

Shibata et al.

[11] Patent Number: 4,845,477

[45] Date of Patent: Jul. 4, 1989

[54] COLOR BLINKING SYSTEM

[75] Inventors: Ichiroh Shibata, Fujisawa; Shinpei Watanabe, Yokohama, both of Japan

[73] Assignee: International Business Machines Corporation, Armonk, N.Y.

[21] Appl. No.: 161,281

[22] Filed: Feb. 29, 1988

Related U.S. Application Data

[63] Continuation of Ser. No. 802,632, Nov. 27, 1985, abandoned.

[30] Foreign Application Priority Data

Dec. 7, 1984 [JP] Japan ................................ 59-257744

[51] Int. Cl.[4] ................................................ C09G 1/16

[52] U.S. Cl. .................................... 340/703; 340/723; 340/735

[58] Field of Search ............... 340/703, 747, 709, 723, 340/701, 735, 790, 791

[56] References Cited

U.S. PATENT DOCUMENTS

| | | | |
|---|---|---|---|
| Re. 32,187 | 6/1986 | Barda et al. | 340/802 |
| 4,149,152 | 4/1979 | Russo | 340/703 |
| 4,232,311 | 1/1980 | Asenta | 340/703 |
| 4,439,759 | 3/1984 | Fleming et al. | 340/703 |
| 4,524,421 | 6/1985 | Searby | 340/703 |
| 4,626,839 | 12/1986 | O'Malley | 340/732 |
| 4,635,048 | 1/1987 | Nishi et al. | 340/748 |
| 4,646,077 | 2/1987 | Calley | 340/723 |
| 4,703,317 | 10/1987 | Shiomi et al. | 340/703 |

*Primary Examiner*—Gerald L. Brigance
*Attorney, Agent, or Firm*—Douglas W. Cameron

[57] ABSTRACT

An apparatus and method for color blinking in a color display system. The system of this invention comprises: a palette means for converting color codes from a processor to color video signals for ultimate display in a color display, blink color registers for storing a first color video signal representing a first color to be blinked and for storing a second color video signal representing a second color different from the first color and from any colors stored in any palette circuit register, a blink code register for storing the address of the palette register storing the first color video signal, and a control means for alternately writing the first and second color video signals into the palette register represented by the palette register address in synchronization with the cycle of a blink clock.

13 Claims, 5 Drawing Sheets

COLOR BLINKING SYSTEM

TECHNICAL FIELD

This application is a continuation of application Ser. No. 802,632, filed Nov. 27, 1985, now abandoned.

FIELD OF THE INVENTION

This invention relates to a color display of a raster scan type, and more particularly to color blinking on a screen thereof.

BACKGROUND OF THE INVENTION

A method to make specific characters or symbols noticeable on a displayed screen is blinking. In conventional monochromatic displays, characters or symbols were merely blinked. In the early days of color displays, blinking was performed by periodical switching between a specified color and a background color (normally black). However, there are some cases where it is undesirable that a specific color goes off even for a moment. Therefore, it has been proposed to blink using two colors other than black.

In U.S. Pat. No. 4,439,759, for example, a color map memory storing a plurality of color signals is provided, and two color signals are alternately read out of this memory at the time of blinking.

In conventional color blinking systems, since color video signals stored in a color map memory are used, the number of available colors is limited. When a certain color is specified for blinking, an operator watching the screen would be confused if a different color to be displayed alternately with the specified color is used somewhere else on the screen. In order to avoid this problem, normal display colors would have to be distinguished from blink colors. In that case, however, the number of normal display colors is halved.

OBJECT OF THE INVENTION

Therefore, it is an object of this invention to provide a color blinking system in which the number of colors that can be displayed is not limited to the number of color video signals stored in the color map memory.

SUMMARY OF THE INVENTION

According to this invention, since the color signal, representing the second color displayed alternately with the color to be blinked, is held in a blink color register separate from the palette registers; the number of colors that can be displayed is more than the number of palette registers. Since blinking can be performed by only the video circuit after various registers have been set by the MPU, the MPU may execute other jobs during blinking. If the number of blink color registers is increased, blinking between three or more colors can be performed.

The system of this invention comprises a palette circuit for converting a color code read out of a refresh buffer for color display to a color video signal representing a color actually displayed, and a blinking circuit connected to the above palette circuit. The palette circuit consists of a plurality of palette registers addressed by the color codes into which registers different color video signals have previously been written, respectively. The blinking circuit is composed of at least two blink color registers, a blink code register, and a control circuit. Prior to blinking, a processor loads the following: the address of a palette register retaining a color to be blinked into the blink code register, a color video signal (e.g., 6-bit signal) representing the color to be blinked into a selected blink color register, and a color video signal representing a different color to be displayed alternately with the color to be blinked into the other blink color register. The control circuit alternately writes the contents of the blink color registers into the palette register specified by the address in the blink code register, in synchronization with a blink clock having a predetermined cycle (e.g. 0.5 second). Thus, if the refresh buffer is read out in synchronization with a raster scan of a color CTR, and the palette circuit is accessed by a color code therefrom, a specified color and a different color are displayed alternately at dot positions of the specified color, thereby color blinking is achieved.

DESCRIPTION OF THE PREFERRED EMBODIMENT

Figure 1:
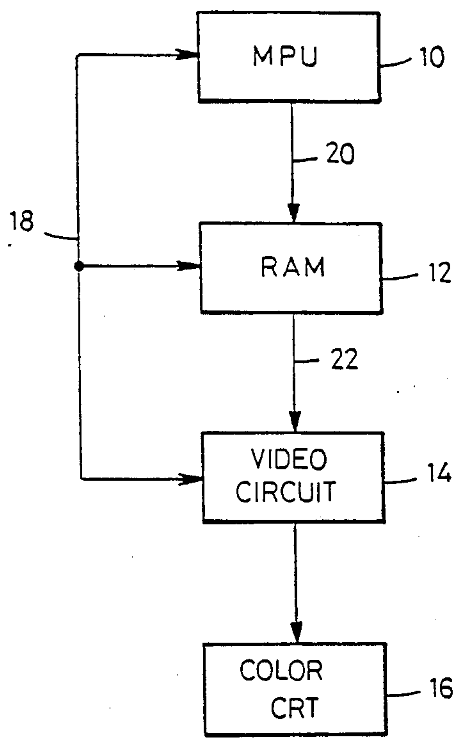
FIG. 1 is a block diagram illustrating an example of the color display system to which this invention is applied.

FIG. 1 schematically shows a particular color display system to which this invention can be applied. This particular system shown is composed of a microprocessing unit (MPU) 10; a random access memory (RAM) 12 for storing color codes each consisting of 4 bits per dot of a color image, and for operating as a refresh buffer; a video circuit 14 for converting a color code read out of the RAM 12 into an actual color video signal; and a color CRT 16 driven by the color video signal from the video circuit 14 to visually display the color image. The MPU 10, RAM 12 and video circuit 14 are interconnected through a data bus 18, and an address for the RAM 12 is given from the MPU 10 via an address bus 20. The RAM 12 is continuously read out in synchronization with the raster scan of the color CRT 16 when the color image is displayed, and each color code is sent from the RAM to the video circuit 14 through a memory bus 22.

Since the MPU 10, RAM 12 and color CRT 16 may be conventional ones, their details will not be described.

Figure 2:
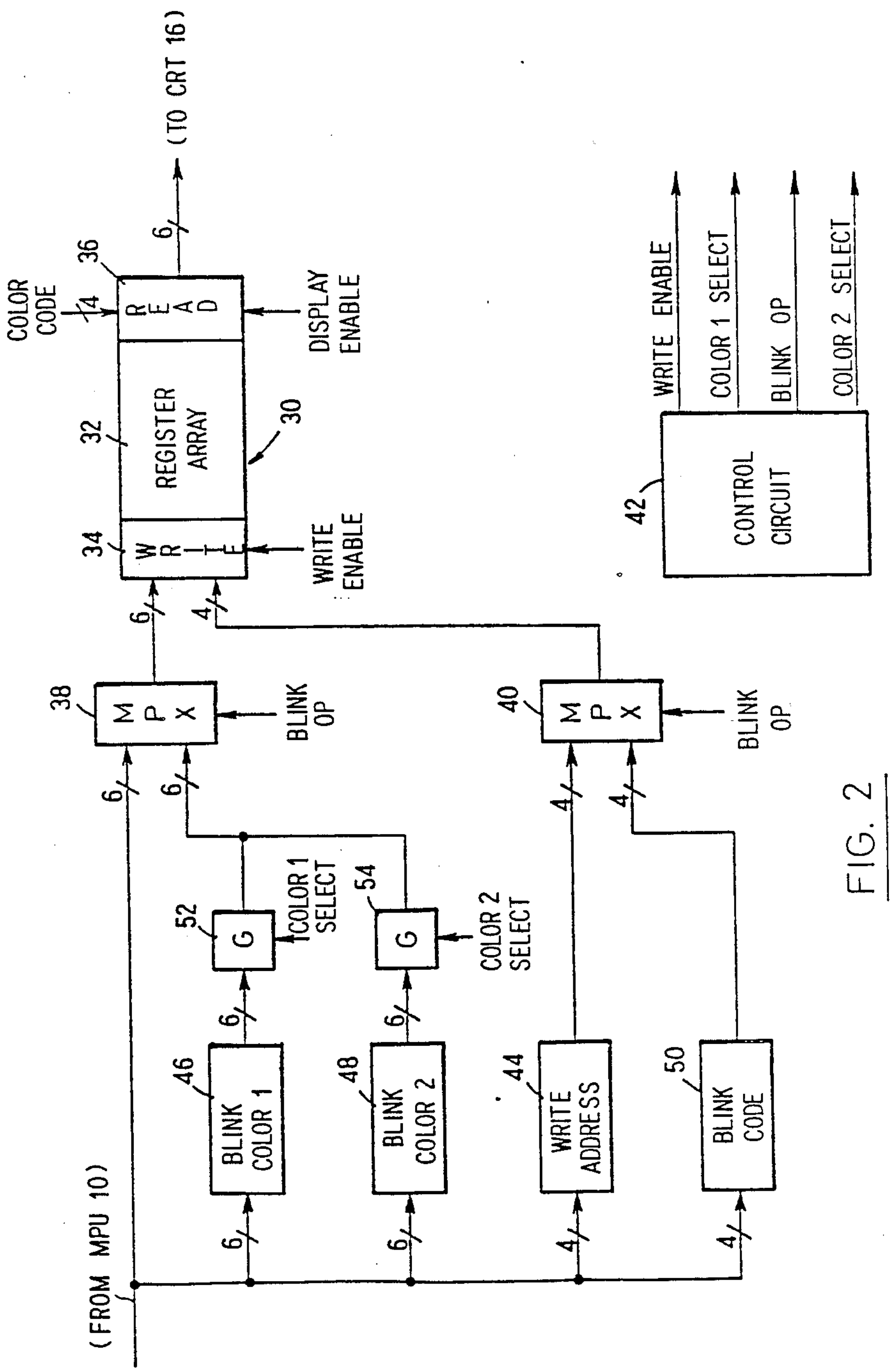
FIG. 2 is a block diagram illustrating the configuration of the video circuit.

An example of configuration of the video circuit 14 including a color blinking mechanism according to this invention is shown in FIG. 2. The nucleus of the video circuit 14 is a palette circuit 30 operating as a color map memory. The palette circuit 30 is composed of a register array 32 consisting of 16 palette registers each storing an actual color video signal, a write circuit 34, and a read circuit 36. In this example, each of the color video signals stored in the palette registers consists of 6 bits, and therefore, the palette circuit 30 enables 16 out of 64 colors to be displayed. If the number of palette registers forming the register array 32 and/or the number of their bits is changed, the number of displayable colors can be changed. The write circuit 34 receives a 6-bit color video signal, and a 4-bit code specifying a palette register into which the color video signal is written. When enabled by a display enable signal, the read circuit 36 receives a 4-bit color code read out of the RAM 12 in FIG. 1, and sends the content of the palette register specified by the 4-bit color code to the color CRT 16.

The 6-bit color video signal to be written into the register array 32 is supplied by a first multiplexer (MPX) 38, and the 4-bit code specifying the palette register is supplied by a second multiplexer (MPX) 40. Each of the first MPX 38 and second MPX 40 selects one of two inputs depending on whether a blink operation signal is active ("1") or inactive ("0"). The blink operation signal is supplied from a control circuit 42, and alternates activation and deactivation at a cycle of, for example, 0.5 seconds, as long as the register array 32 is rewritable. In addition to this signal, the control circuit 42 generates write enable, color 1 select and color 2 select signals.

When the blink operation signal is inactive, the first MPX 38 and the second MPX 40 pass a 6-bit color video signal from the MPU 10 and a 4-bit register address in a write address register 44 to the write circuit 34, respectively. The write circuit 34 writes the color video signal into the palette register specified by the register address only when the write enable signal is active.

When the blink operation signal is active, the first MPX 38 sends a 6-bit color video signal in either a blink color 1 register 46 or a blink color 2 register 48 to the write circuit 34 depending on whether the color 1 select signal or color 2 select signal is active. At this time, the second MPX 40 sends a 4-bit code (palette register address) in a blink code register 50 to the write circuit 34. The blink color 1 register 46 holds a color signal representing a color to be blinked, the blink color 2 register 48 holds a color signal representing a different color displayed alternately with the color to be blinked, and the blink code register 50 holds the address of the palette register storing the color signal representing the color to be blinked. The contents of the registers 46, 48 and 50 are set by the MPU 10 when the blinking of a particular color is requested. Thus, if the color video signals representing two different colors are written alternately in the palette register specified by the blink code register 50, color blinking is performed on the screen of the color CRT 16 at the cycle of 0.5 second when the read circuit 36 reads this palette register in synchronization with the raster scan of the color CRT 16.

Figure 3:
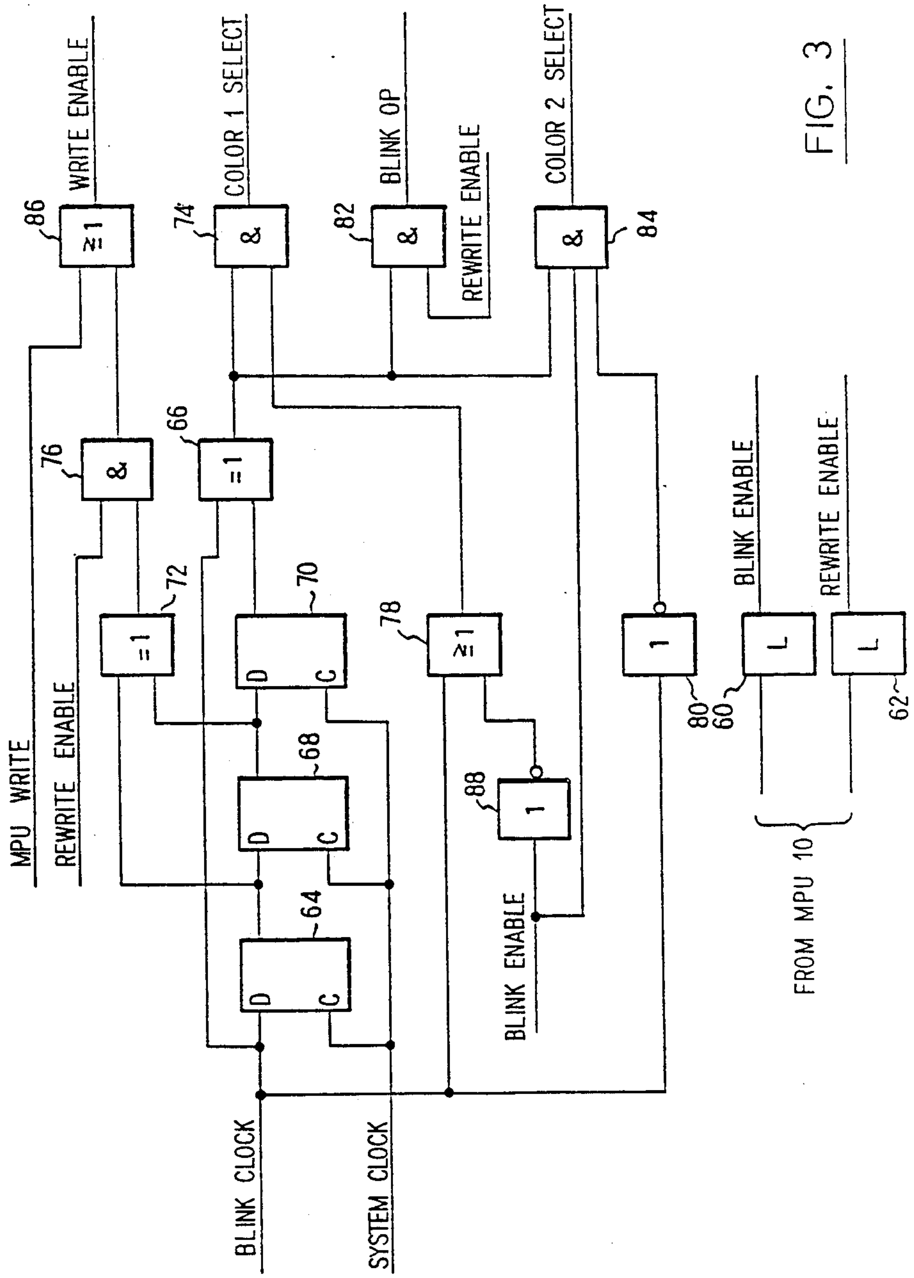
FIG. 3 is a circuit diagram showing the detail of the control circuit.
Figure 4:
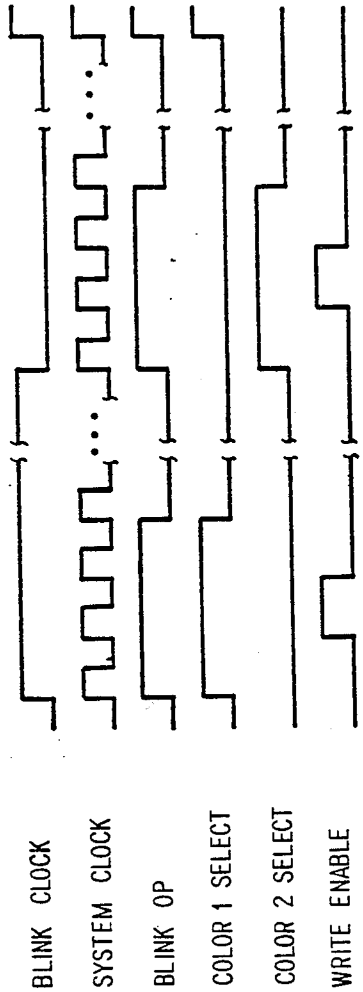
FIG. 4 is a timing diagram for various signals in the control circuit.

Referring next to FIG. 3, the detail of the control circuit 42 will be described. A timing of each signal is shown in FIG. 4 in which it is assumed that both the blink enable and rewrite enable signals are active. The blink enable and rewrite enable signals are output signals of latches 60 and 62 set by the MPU 10. In response to these signals, and blink and system clocks provided from a timing control facility (not shown), the control circuit 42 generates the blink operation, write enable, color 1 select and color 2 select signals.

As shown in FIG. 4, the blink clock and system clock signals are periodically applied regardless of whether blinking is performed or not. In this example, the cycles of the blink clock and system clock signals are 0.5 second and 400 nanoseconds, respectively, but other cycles can, of course, be used.

The blink clock signal is applied to the data input D of a first flip-flop 64, the first input of an exclusive OR gate 66, the first input of an OR gate 78, and an inverter 80. The system clock signal is applied to the clock inputs C of three flip-flops 64, 68 and 70 forming a shift register. The output of the flip-flop 64 is connected to the first input of an exclusive OR gate 72 and the data input of the flip-flop 68, the output of the flip-flop 68 is connected to the second input of the exclusive OR gate 72 and the data input of the flip-flop 70, and the output of the flip-flop 70 is connected to the second input of the exclusive OR gate 66.

The output of the exclusive OR gate 66 is connected to the first input of an AND gate 74 for generating the color 1 select signal, the first input of an AND gate 82 for generating the blink operation signal, and the first input of an AND gate 84 for generating the color 2 select signal. The output of the exclusive OR gate 72 is connected to the second input of an AND gate 76 with its first input receiving the rewrite enable signal from the latch 62. The output of the AND gate 76 is connected to the second input of an OR gate 86 whose first input receives an MPU write signal. The OR gate 86 generates the write enable signal if either one of the inputs is in the active state.

The second input of the AND gate 74 is connected to the output of the OR gate 78. The second input of the AND gate 82 is connected to the output of the latch 62. The second input of the AND gate 84 is connected to the output of the latch 60, and the third input of AND gate 84 is connected to the output of the inverter 80 inverting the blink clock signal.

Referring also to FIG. 4, the operation of the circuit shown in FIG. 3 will be described.

As described above, the latches 60 and 62 are assumed to have already been set by the MPU 10. This means that the blinking of a specific color is performed in the system of FIG. 1. When the blink clock becomes active under this condition, the flip-flop 64 is set by a positive going transition of a first system clock pulse. Since the flip-flop 70 has been reset at this time, the exclusive OR gate 66 is conditioned to make its output active. Since the blink clock signal is also applied to the OR gate 78, the AND gate 74 is conditioned by the outputs of the exclusive OR gate 66 and the OR gate 78, and generates the color 1 select signal. This signal is applied to a gate 52 in FIG. 2, causing the content of the blink color 1 register 46 to be passed to the first MPX 38. The AND gate 82 is also conditioned at this time, and generates the blink operation signal. Therefore, the first MPX 38 sends the color signal, having passed through the gate 52, to the write circuit 34. The blink operation signal is also applied to the second MPX 40 as a select signal, causing the content of the blink code register 50 to be passed to the write circuit 34. Since the write enable signal is not generated at this time, the write circuit 34 does not perform a write operation into the register array 32.

The write enable signal is generated by the OR gate 86 when the output of the flip-flop 64 differs from the output of the flip-flop 68, or between the positive going transitions of second and third system clock pulses. The operation of the write enable 34 will be described later. The flip-flop 70 outputs the set state by the positive going transition of a fourth system clock pulse. Since the blink clock is still active, the two inputs of the exclusive OR gate 66 coincide with each other, and therefore, its output becomes inactive to prevent the AND gates 74 and 82 from generating the color 1 select and blink operation signals. When the output of the AND gate 82 is inactive, the MPU 10 can write into the register array 32. In that case, the MPU 10 responds to the inactive blink operation signal by first loading into the address register 44 the address of a palette register to be written, and then supplying to the first MPX 38 a 6-bit color signal to be written into this palette register and generating the MPU write signal. The MPU write signal is applied to the write circuit 34 through the OR gate 86 as the write enable signal. Thus, the color signal is written into the palette register by the MPU 10. In normal cases, however, such writing by the MPU 10 is done only when the register array 32 is initialized.

When the blink clock is changed from active to inactive, the input condition (inconsistency) of the exclusive OR gate 66 is satisfied again, and its output is made active. Since the blink clock is now inactive, however, the AND gate 84 is conditioned instead of the AND gate 74 to generate the color 2 select signal. The latches 60 and 62 remain set. The AND gate 82 is conditioned simultaneously with the AND gate 84 to generate the blink operation signal again. The generation timing of the write enable signal is the same as when the blink clock was in the active state. As the result, the 6-bit color signal in the blink color 2 register 48 is written into the palette register specified by the blink code register 50. The outputs of the OR gate 86 and AND gates 82 and 84 become inactive at the same timings as above.

If the above operations are repeated while the latches 60 and 62 are set, first and second color signals are alternately written into the palette register specified by the blink code register 50 at the cycle of 0.5 second. Therefore, when the content of this palette register is read out in synchronization with the raster scan, a specified color (blink color 1) and a color (blink color 2) different therefrom are alternately displayed at the same dot positions on the screen of the color CRT 16. It is desirable that the content of the blink color 2 register 48 is different from the 16 color video signals stored in the register array 32.

When blinking is to be stopped, the latch 60 is reset by the MPU 10. As the result, the second input of the AND gate 74 is maintained active by the operation of the inverter 88 while the second input of the AND gate 84 is maintained inactive. Regarding the color select signals, therefore, only the color 1 select signal is generated each time the blink clock changes state. Since the write enable and blink operation signals are generated at the same timing as before, only the content of the blink color 1 register 46 is written periodically into the palette register specified by the blink code register 50. As an alternative, if the latch 62 is reset following a first color 1 select signal which is generated after the latch 60 is reset, the output of the AND gate 76 becomes inactive and such periodical writing is, therefore, no longer performed.

When blinking is requested again by specifying a particular color, the latch 62 is reset by the MPU 10 if it is still set. This is to inhibit writing from the blink color 1 register 46 to the register array 32 while the MPU 10 sets the registers 46, 48 and 50. Next, the MPU 10 loads into the blink color 1 register 46 a color signal representing the color to be blinked among the 16 color signals stored in the register array 32, loads into the blink color 2 register 48 a color signal representing a different color to be displayed alternately with the above color, and loads into the blink code register 50 the address of a palette register storing the color signal representing the color to be blinked. The registers 46, 48 and 50 may be loaded in any order. At that time, the MPU 10 sends a register address and data to be loaded to the video circuit 14 through the bus 18. The video circuit 14 has a decoder (not shown) for decoding the register address from the MPU 10, with the decoder output, enabling a selected register, e.g., the blink color 1 register 46, to load the data from the MPU 10. If the bus 18 has a sufficient width, the register address and data could be transferred simultaneously, but since the bus width is limited in the ordinary color display systems, these will be transferred sequentially.

After setting of the registers 46, 48 and 50 has been completed, the MPU 10 sets the latches 60 and 62 again so that the blink operation described above is commenced.

Figure 5:
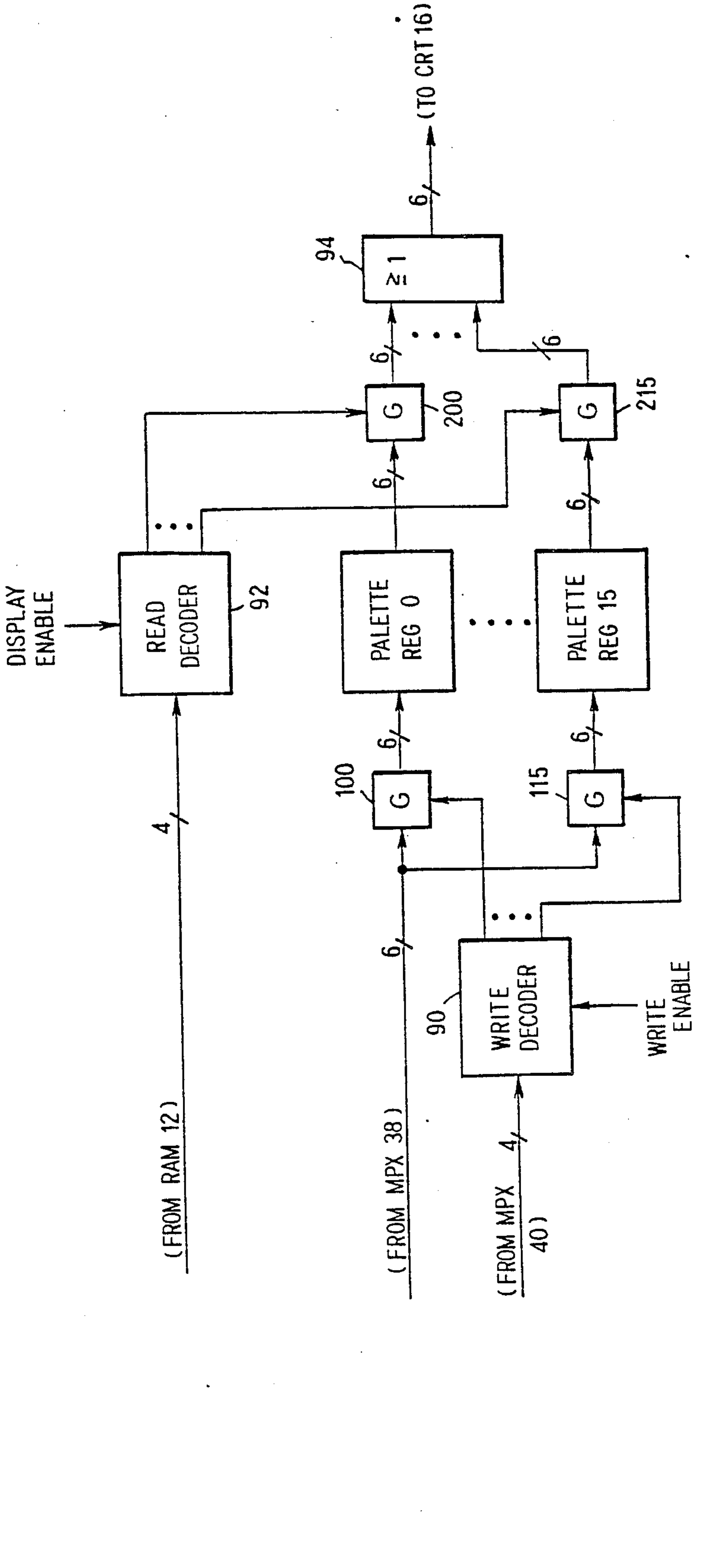
FIG. 5 is a block diagram illustrating the configuration of the palette circuit.

Finally, referring to FIG. 5 which shows the detail of the palette circuit 30, the write and read operations of the register array 32 will be described.

The register array 32 consists of 16 palette registers 0–15; the write circuit 34 consists of a write decoder 90 and 16 write gates 100–115 corresponding to the palette registers 0–15, respectively; and the read circuit 36 consists of a read decoder 92, 16 read gates 200–215 corresponding to the palette registers 0–15, respectively, and an OR gate 94. The write decoder 90, when enabled by the write enable signal, decodes the 4-bit palette register address from the second MPX 40, and activates a corresponding one of 16 output lines respectively connected to the conditioning inputs of the write gates 100–115. A write gate conditioned thereby loads the 6-bit color signal from the first MPX 38 into a corresponding palette register.

The read decoder 92, when enabled by the display enable signal, decodes the 4-bit color code which is read out of the RAM 12 in synchronization with the raster scan, and conditions a read gate corresponding to it. The conditioned read gate transfers the content of a corresponding palette register to the color CRT 16 through the OR gate 94. The display enable signal for enabling the read decoder 92 is generated by the timing control facility described above when the information stored in the RAM 12 is to be visually displayed by the color CRT 16.

During blinking, the write enable and display enable signals may be generated at the same time. However, even if the same palette register is written and read simultaneously, no problem will arise because flickering on the screen due to the rewrite operation of the palette register is instantaneous, and is not recognized by human eyes.

Although the embodiments with two blink color registers have been described above, this invention is not limited thereto. If three or more blink color registers are provided, blinking between three or more colors can be performed. In such a case, it is required that the control circuit 42 be designed so that color 1 to color n (with $n \geqq 3$) select signals are sequentially and cyclically generated.

Having thus described our invention, what we claim as new and desire to secure by Letters Patent is:

1. In a color display system including a color display, and a refresh buffer for storing color images to be displayed in the color display by means of color codes having a plurality of bits for each dot position on the color display, a color blinking system, wherein blinking is the alternate displaying of two different colors at the same dot position of the color display, said blinking system comprising:

palette means for converting each of the color codes read out of the refresh buffer to a particular color video signal which is a code which represents a color to be actually displayed in the color display, said palette means comprising a plurality of palette registers, each register retaining only a single color video signal, each color code being a code representing the address of a respective register of said palette registers in said palette means; at least two blink color registers;

loading means, responsive to a request to blink a first color represented in one of said palette registers, for loading a first color video signal representing said first color into a first of said blink color registers, and for loading a second color video signal representing a second color into a second of said blink color registers different than said first blink color register, said second color video signal being a color video signal which, at the time of its being loaded into said second blink color register, is independent of color video signals stored in said palette means, said second color video signal being generated from a microprocessing unit;

a blink code register for storing at least one color code;

means for loading a color code for said one palette register retaining the color video signal representing said first color into said blink code register;

control means for writing alternately, at the time of blinking and in response to a request to blink said first color, the color video signals stored in said blink color registers into said one palette register specified by said color code in said blink code register in synchronization with the predetermined cycle of a blink clock; and means for alternately reading said one palette register specified by said color code so that said first and second color video signals can be transmitted to said color display resulting in blinking of said two different colors at said same dot position of said color display.

2. A color blinking system as recited in claim 1, wherein said palette means comprises:

a write circuit including a write decoder for decoding the color code loaded into said blink code register, and a plurality of write gates for loading a color video signal from any one of the blink color registers into the palette register specified by the color code in said blink code register when conditioned by said write decoder; and a read circuit including a read decoder for decoding a color code read from the refresh buffer, and a plurality of read gates for sending to the color display a color video signal retained in a corresponding palette register when conditioned by said read decoder.

3. A color blinking system as recited in claim 2, wherein said control means periodically generates write enable signals in response to said blink clock, and wherein said write circuit performs a write operation into the palette register specified by the color code in said blink code register only when enabled by said write enable signal.

4. A color blink system as recited in claim 1, wherein the control means alternately writes color video signals into at most one palette register during blinking.

5. A color blinking system as recited in claim 1, wherein the control means comprises a plurality of gates, each gate being connected to a particular one of said blink color registers, and wherein either a color 1 select signal or a color 2 select signal is applied to a respective gate to send a color video signal, stored in the blink color register to which the respective gate is connected, to said palette means.

6. A color blinking system as recited in claim 1, wherein the means for loading the blink color registers comprises a decoder for loading the blink color register specified by the register address loaded in the decoder.

7. A color blinking as recited in claim 1, further comprising a palette loading means for loading any of said palette registers, without using said blink code register, with a color video signal.

8. A color blinking system as recited in claim 7, wherein said palette loading means comprises a write address register which stores a color code representing the address of the palette register which is to be loaded with a color video signal.

9. A color blinking system as recited in claim 7, wherein said palette loading means loads the palette registers only when a blink operation signal is inactive.

10. In a color display system, including a color CRT in which images are displayed therein by means of color codes having a plurality of bits for each dot position in the color CRT, a color blinking system, wherein blinking is the alternate displaying of two different colors at the same dot position of the color CRT, said blinking system comprising:

a palette including a read circuit, a write circuit and an array of palette registers, the read circuit and palette registers being used to convert the color codes into color video signals with each palette register being used to store only a single color video signal and with each of the color codes being a code used to identify a respective one of said palette registers, and the read circuit being used to send the color video signal that is in the palette register that is specified by the color code to the color CRT, the color video signal being a code which represents an actual color to be displayed on the CRT;

a plurality of blink color registers with at least a first of said blink color registers being used to store a first color video signal which is the same as a signal stored in one of said palette registers and with at least a second of said blink color registers being used to store a second color video signal which, at the time of its being loaded into said second blink color register, is independent of any of the color video signals stored in any of said palette registers, said second color video signal being generated by a microprocessing unit;

a means for loading said first and second color video signals into at least said first and second blink color registers, including a decoder for enabling a respective blink color register to be loaded;

a blink code register for storing a color code specifying said one palette register retaining said first color video signal;

a means for loading the color code specifying said one palette register retaining said first color video signal into said blink code register;

a control means for alternately, at the time of blinking and in response to a request to blink said first color, writing said first and second color video signals into said one palette register specified by the color code in said blink code register in synchronization with the predetermined cycle of a blink clock; and means for alternately reading said one register specified by said color code so that said first and second color video signals can be transmitted to said color display resulting in blinking of said two different colors at said same dot position of said color display.

11. A color blinking system as recited in claim 10, wherein the control means generates a blink operation signal which when applied to a plurality of multiplexers allows said first and second color video signals to be sent to said palette circuit and which when not applied to the multiplexers allows color video signals from a processor to be loaded into said palette circuit.

12. In a color display system, including a color CRT in which images are displayed therein by means of color codes having a plurality of bits for each dot position in the color CRT, the color codes being converted to respective color video signals by means of a palette circuit which contains an array of palette registers for storing the respective color video signals, each of said color video signals being a code representing a color to be displayed in the color CRT, and each of said color codes being a code representing the address of a respective register of said array of registers, a color blinking method, wherein blinking is the alternate displaying of two different colors at the same dot position of the color CRT, said blinking method comprising the steps of:

storing a first color video signal in a first blink color register and storing a second color video signal independent of said first color video signal in a second blink color register, the second color video signal being, at the time of its being loaded into said second blink color register, independent of said respective video signals stored in said array of registers, said second color video signal being generated from a microprocessing unit;

storing a color code, specifying one of said palette registers, in a blink code register, said one palette register having said first color video signal stored therein with said one palette register storing only one color video signal at a time;

alternately writing said first and second color video signals from said blink color registers into said one palette register in synchronization with a blink clock having a predetermined cycle; and alternately reading said one palette register specified by said color code so that said first and second color video signals can be transmitted to said color display resulting in blinking of said two different colors at said same dot position of said color display.

13. A method as recited in claim 12, wherein the first color video signal is the same as the color video signal stored in said one palette register.

* * * * *